J. G. BECKER.
PEA DRILL.
APPLICATION FILED DEC. 3, 1912.

1,079,310.

Patented Nov. 18, 1913.
2 SHEETS—SHEET 1.

Witnesses

John G. Becker, Inventor by ...........
Attorneys

J. G. BECKER.
PEA DRILL.
APPLICATION FILED DEC. 3, 1912.
1,079,310.
Patented Nov. 18, 1913.
2 SHEETS—SHEET 2.
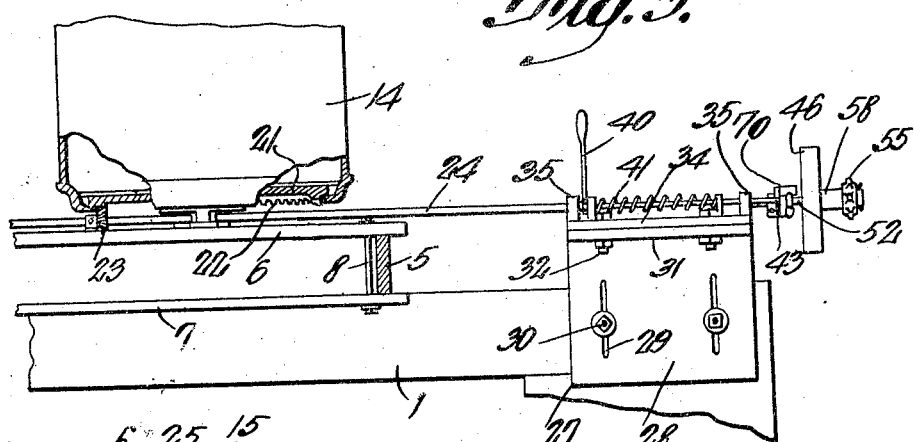
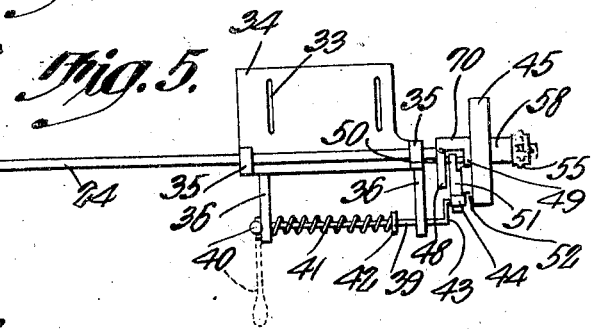
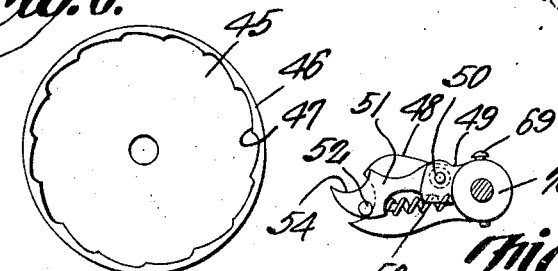
John G. Becker, Inventor
Witnesses
by C. A. Snow & Co.
Attorneys

UNITED STATES PATENT OFFICE.

JOHN G. BECKER, OF CAMPBELL, MISSOURI.

PEA-DRILL.

1,079,310.

Specification of Letters Patent.   Patented Nov. 18, 1913.

Application filed December 3, 1912.   Serial No. 734,786.

*To all whom it may concern:*

Be it known that I, JOHN G. BECKER, a citizen of the United States, residing at Campbell, in the county of Dunklin and State of Missouri, have invented a new and useful Pea-Drill, of which the following is a specification.

The present invention aims to provide an attachment which may be united with a cultivator of standard construction, and particularly with a disk cultivator, to the end that when the standing corn is worked for the last time in the season, two rows of peas or another grain, may be planted simultaneously, the rows of peas standing at a uniform distance from the corn rows, the construction being such that one of the cultivator disks will cover the peas or other seed which has been deposited in the ground.

The invention aims to provide a device of the type above mentioned which may readily be attached to a cultivator, and, with equal facility, be removed therefrom.

Specifically, the invention aims to provide novel means for actuating the seed distributer and for operatively connecting the seed distributer with the ground wheel for a cultivator or the like vehicle.

With the foregoing and other objects in view which will appear as the description proceeds, the invention resides in the combination and arrangement of parts and in the details of construction hereinafter described and claimed, it being understood that changes in the precise embodiment of the invention can be made within the scope of what is claimed without departing from the spirit of the invention.

Figure 1:
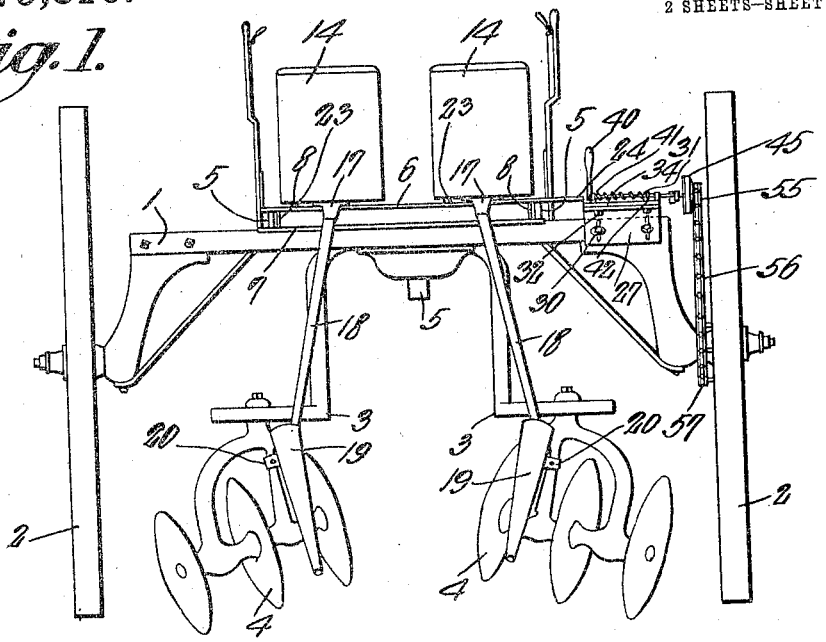
Figure 2:
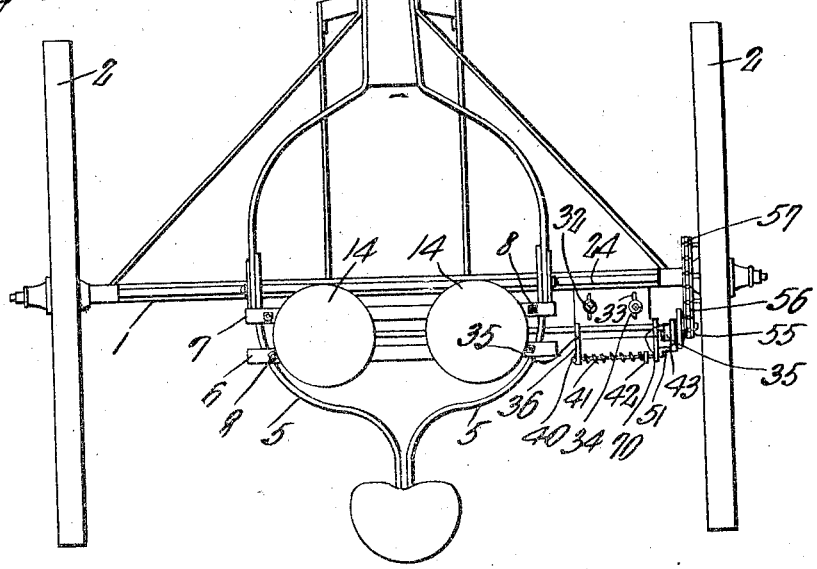

In the drawing:—Figure 1 shows the invention in rear elevation, applied to a cultivator; Fig. 2 is a top plan of the structure shown in Fig. 1; the cultivator disks and attendant parts being omitted, for the sake of clearness; Fig. 3 is a detail enlarged from Fig. 1, portions being broken away and sectioned; Fig. 4 is a perspective showing means whereby the seed receptacles are mounted; Fig. 5 is a fragmental top plan of the actuating mechanism for the seed distributer; Fig. 6 is a plan of the ratchet wheel which constitutes a part of the actuating mechanism for the seed distributer; Fig. 7 is an elevation of the pawl and attendant parts which coöperate with the ratchet wheel shown in Fig. 6; Fig. 8 is a perspective showing the means whereby the lever is held against movement; and Fig. 9 is an elevation of the tubular head which receives the seed from the seed receptacle.

In carrying out the invention there is provided a supporting structure, the same in the present instance taking the form of a cultivator, the frame whereof is denoted by the numeral 1. The frame 1 supports for rotation, ground wheel 2. Hangers 3 depend from the frame 1, the hangers 3 supporting a plurality of cultivator disks 4, although it is to be understood that the cultivators may be of any desired form. Supported by the frame 1 of the cultivator are seat bars 5.

Extended across the upper edges of the seat bars 5 are supporting bars 6, other supporting bars 7 being extended across the lower edges of the seat bars 5. Bolts 8 unite the supporting bars 6 and 7, and serve to clamp the same firmly in place upon the seat bars 5.

Two seed dropping mechanisms are provided, but since these mechanisms are of identical construction, but one of them will be described in detail.

Extended transversely of the bars 6 is a platform 9, having depending shoulders 10 which engage the adjacent faces of the bars 6. Bolts 11 extend through openings 12 in the bars 6, the bolts 11 being engaged with the ends of the platform 9 to hold the platform in place upon the bars 6. The bolts 11 engage a seed receptacle 14, and serve to hold the seed receptacle in place on the platform 9. The rear end of each platform 9 extends beyond the rear edge of the bar 6, the rear end of the platform 9 being equipped with openings 15, adapted to receive hooks 16 formed upon a conical head 17 supporting a pipe 18 which is preferably flexible, the pipe 18 entering a conical discharge member 19 secured by means of a bracket 20 to the disk yoke. The head 17, the pipe 18 and the discharge member 19 constitute a chute which serves to deposit the peas or other grain outside of the inner most cultivator disk 4. The distributer ring of each seed receptacle 14 is denoted by the numeral 21, the ring 21 being provided in its lower face with a rack 22, adapted to engage a pinion 23 secured to a shaft 24, alined vertically with the frame 1 of the cultivator, the inner end of the shaft 24 being journaled upon the platforms 9, and held in place by a bearing plate 25 which is secured by means of bolts 26 or the like to the upper face of each platform.

A bracket 27 is shown, the same comprising a vertical flange 28, provided with slots 29, receiving bolts 30, which enter one end of the frame 1, to hold the bracket 27 in place, and to provide for a vertical adjustment of the bracket. The horizontal flange of the bracket 27 is indicated by the numeral 31. The flange 31 receives bolts 32, adapted to move in slots 33, formed in a supporting plate 34, to the end that the supporting plate may be held in place upon the bracket 27, rigidly, and for horizontal adjustment. Fixed to and upstanding from the bearing plate 24 are bearings 35 in which the shaft 24 is journaled for rotation. The bearing plate 34 is equipped with rearwardly extended arms 36, one of which, as clearly shown in Fig. 8, is provided with notches 37 and 38. A shaft 39 is journaled in the arms 36, the shaft 39 being provided at one end with a handle 40 which may be engaged in the notches 37 and 38, to adjust the position of the shaft 39 circumferentially, it being understood that the shaft 39 is free to slide longitudinally in the arms 36, so that the handle 40 may be engaged in either of the notches 37 or 38. The shaft 39 carries between the arms 36, an abutment 42, engaged by one end of a compression spring 41, the other end of which abuts against that arm 36 which is provided with the notches 37 and 38. At its outer end, the shaft 39 is equipped with a crank 43, carrying a roller 44, the roller 44 having functions which will be set forth hereinafter. Journaled on the other end of the shaft 24 is a bearing ring 58, carrying a wheel 45 provided with a laterally projecting rim 46, the inner face of which is provided with ratchet teeth 47. Secured at 69 to the end of the shaft 24 is a head 70. Projecting radially from the head 70 is an arm 48, located relatively near to another arm 49 which likewise projects from the head 70. Pivotally supported as shown at 50, in the arms 48 and 49 is a pawl 51 provided with a laterally projecting stud 52 adapted to engage the ratchet teeth 47 of the wheel 45. The stud 52 is constrained normally into engagement with the ratchet teeth 47 by means of a spring 53, one end of which is secured to the head 70 the other end of which is secured to the pawl 51. At its outer end, the pawl 51 is provided with a recess 54, in which, under circumstances to be pointed out hereinafter, the roller 44 which is carried by the shaft 39, is adapted to be received.

The outer end of the bearing 58 is provided with a sprocket wheel 55, engaging a sprocket chain 56, passed about a larger sprocket wheel 57 operatively connected with one ground wheel 2 for rotation therewith.

When the ground wheel 2 is rotated, rotary movement will be imparted to the sprocket wheel 57, and from the sprocket wheel 57, the chain 56 will transmit rotatory movement to the sprocket wheel 55, rotatory movement being thus imparted to the bearing 58 which is journaled for rotation upon the outer end of the shaft 24. When the bearing 58 is rotated, the ratchet wheel 45 will be rotated. It is to be noted that the mounting 50 of the pawl 51 is eccentric with respect to the center of rotation of the shaft 24, and consequently when the bearing 58 is rotated forwardly, the stud 52 of the pawl 51 will engage the ratchet teeth 47 of the wheel 45, and thus the member 58, the head 70 and the shaft 24 will be rotated.

When the shaft 24 is rotated, the pinion 23 will be actuated, the pinion 23, meshing into the rack 22 will rotate the distributer ring 21, the peas or other grain being deposited in the tubular head 17, and passing thence into the pipe 18 and from the pipe 18 into the discharge member 19, the grain being deposited by the discharge member 19, within the furrow formed by the innermost cultivator disk 4.

When it is desired to disconnect the distributer mechanism from the ground wheel which carries the sprocket wheel 57, the shaft 39 is slid longitudinally, to put the spring 41 under compression, the handle 40 being engaged in the notch 37 by the pressure of the spring 41 against the abutment 42. The crank 43 will thereupon be swung to position the roller 44 in the path of the recess 54 in the pawl 51. The pawl 51 will thus be upheld, at its free end, to such an extent that the stud 52 will click over the ratchet 47 of the wheel 45, the ground wheel 2 being thus permitted to rotate forwardly without actuating the shaft 24. When the handle 40 is engaged in the notch 38, the roller 44 will be withdrawn out of the path of the recess portion 54 of the pawl 51, permitting the stud 52 of the pawl to engage the ratchet teeth 47 of the wheel 45, so that when the ground wheel 2 is rotated forwardly, the shaft 24 will be connected operatively with the ground wheel.

Having thus described the invention, what is claimed is:—

1. In a device of the class described, a vehicle; a bracket vertically adjustable on the vehicle; a bearing member horizontally adjustable upon the bracket in the direction of travel of the vehicle; a shaft journaled in the bearing member; means extending in the direction of travel of the vehicle for driving the shaft; a seed distributing element movably mounted upon the support; and means for operatively connecting the seed distributing element with the shaft.

2. In a device of the class described, a vehicle; a bracket vertically adjustable upon the vehicle; a bearing member horizontally adjustable upon the bracket in the direction of travel of the vehicle; a shaft journaled for rotation in the bearing member; a seed distributing element movably mounted upon the support; means for operatively connecting the seed distributing element with the shaft; a driving element; means for clutching the driving element to the shaft; and movable means mounted upon the bearing member for disengaging the clutch means.

3. In a device of the class described, clamping members; means for connecting the clamping members; a seed distributer mounted upon one clamping member; a vertically adjustable bracket; a horizontally adjustable bearing member carried by the bracket; a shaft journaled in the bearing member and operatively connected with the distributer; and means for actuating the shaft.

In testimony that I claim the foregoing as my own, I have hereto affixed my signature in the presence of two witnesses.

JOHN G. BECKER.

Witnesses:
L. J. CARTER,
W. H. NAPPER.